No. 882,746.
PATENTED MAR. 24, 1908.
A. L. COX.
LOAD HOLDING DEVICE.
APPLICATION FILED FEB. 21, 1906.
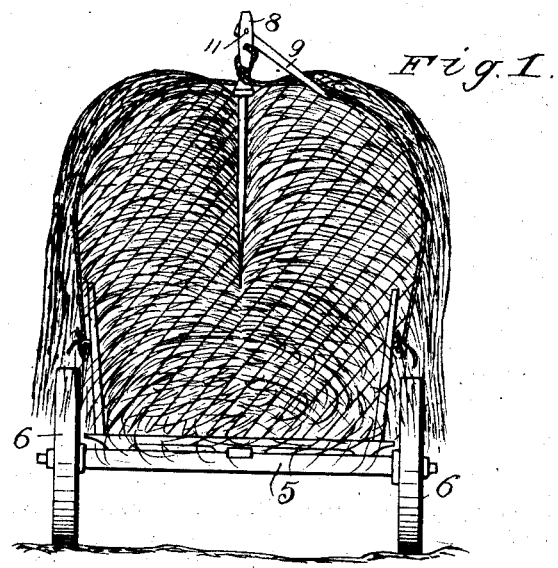
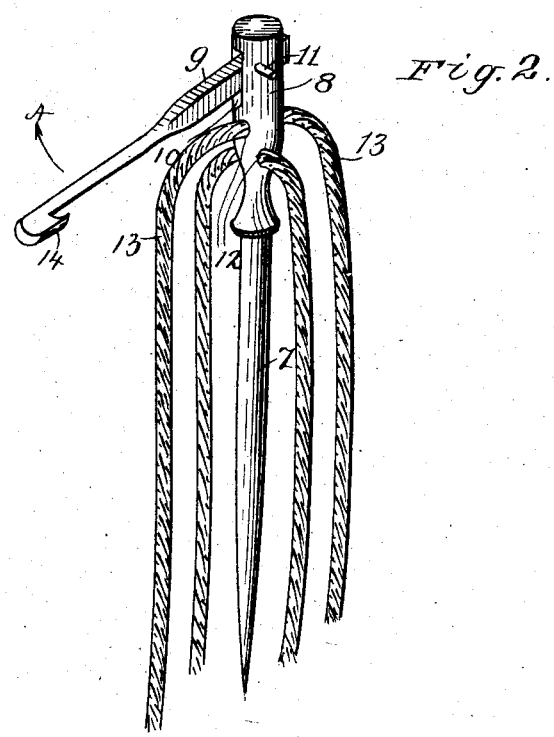
Witnesses
W. Rice Edelen
Frank G. Campbell
Inventor
Alvin L. Cox
by Shepherd & Parker
His Attorneys

UNITED STATES PATENT OFFICE.

ALVIN L. COX, OF MADISON, MISSOURI.

LOAD-HOLDING DEVICE.

No. 882,746.  Specification of Letters Patent.  Patented March 24, 1908.

Application filed February 21, 1906. Serial No. 302,239.

*To all whom it may concern:*

Be it known that I, ALVIN L. COX, a citizen of the United States, residing at Madison, in the county of Monroe and State of Missouri, have invented certain new and useful Improvements in Load-Holding Devices, of which the following is a specification.

My invention relates to a load holding device and has for its object the provision of simple and efficient means for binding a load of hay, straw, wheat, oats or like material upon a wagon.

Further objects and advantages of the invention will be set forth in the detailed description which now follows.

In the accompanying drawing; Figure 1 is a rear elevation of a wagon with a load of hay indicated in section thereon, illustrating the manner of using this improved load holding device, and Fig. 2 is a perspective view of the load holding device.

Like numerals designate corresponding parts in both of the figures of the drawing.

In the drawing, the numeral 5 designates the rear bolster of an ordinary farm wagon and the numerals 6 the rear wheels of said wagon. This improved load holding device comprises a pointed stake 7 having an enlarged head 8, in which is pivoted a lever 9 which passes through a slot 10 and is held in place by a pivot 11. Passing through openings 12 formed through the head 8 are ropes or other flexible cables 13. A lip or lug 14 is formed upon the outer end of the lever 9 and serves a purpose which will be hereinafter described.

The operation of the device is as follows: When it is desired to use the herein described load holder to secure a load of hay or like material upon a wagon, the stake 7 is forced into the load of hay at approximately the center thereof and until said stake assumes the position shown in Fig. 1. The ends of the cables 13 are then secured in any desired manner at the four corners of the wagon, after which the stake is turned bodily by the lever 9 to thereby wind the bight of the cables 13 upon the head 8, as illustrated in Fig. 1. To do this the lever 9 is moved in the direction of the arrow A in Fig. 2. This bodily turning of the stake serves to place the cables 13 under tension to thereby bind the load firmly upon the wagon as will be readily understood. When the ropes have been placed under the desired degree of tension, the lip 14 is hooked under one of the ropes to prevent the stake from turning in a reverse direction. This will, of course, prevent the ropes from unwinding and maintain them at the tension to which they have been adjusted.

While the elements herein shown and described are well adapted to serve the purpose for which they are intended, it is to be understood that my invention is not limited to the precise construction set forth, but includes within its purview such changes as may be made within the scope of the appended claims.

Having described my invention, what I claim, is:

A device of the character described, comprising a pointed stake having an enlarged head provided with superposed openings extending therethrough at right angles to one another and adapted for the reception of binding ropes, said head being further provided with a longitudinal slot above said opening, an operating lever having a squared end for engagement within said slot, and having its outer rounded end formed with a hook thereon, and a locking pivot pin adapted for insertion through alined openings in said head and said lever at an approximately central point of said slot and forming a positive pivot for said lever to allow of the depression of the same to engage said outer hooked end with one of said binding ropes, substantially as described.

In testimony whereof I affix my signature in presence of two witnesses.

ALVIN L. COX.

Witnesses:
 ARTHUR DRY,
 S. H. FARRELL.